(12) United States Patent
Kifeldt et al.

(10) Patent No.: US 11,230,182 B2
(45) Date of Patent: Jan. 25, 2022

(54) VEHICLE POWERTRAIN SYSTEM

(71) Applicant: Ningbo Geely Automobile Research & Development Co., Ltd., Ningbo (CN)

(72) Inventors: Markus Kifeldt, Säve (SE); Pär Bergström, Askim (SE); Johannes Larsson, Gothenburg (SE)

(73) Assignee: NINGBO GEELY AUTOMOBILE RESEARCH & DEVELOPMENT CO., LTD., Ningbo (CN)

( * ) Notice: Subject to any disclaimer, the term of this patent is extended or adjusted under 35 U.S.C. 154(b) by 0 days.

(21) Appl. No.: 17/344,637

(22) Filed: Jun. 10, 2021

(65) Prior Publication Data

US 2021/0300171 A1    Sep. 30, 2021

Related U.S. Application Data

(63) Continuation of application No. PCT/CN2019/120666, filed on Nov. 25, 2019.

(30) Foreign Application Priority Data

Dec. 19, 2018 (EP) .................................... 18214269

(51) Int. Cl.
| | |
|---|---|
| *B60K 6/387* | (2007.10) |
| *F16D 13/52* | (2006.01) |
| *F16D 21/00* | (2006.01) |
| *B60K 6/543* | (2007.10) |
| *B60K 17/02* | (2006.01) |
| *F16D 21/06* | (2006.01) |

(52) U.S. Cl.
CPC ............. *B60K 6/387* (2013.01); *B60K 6/543* (2013.01); *B60K 17/02* (2013.01); *F16D 13/52* (2013.01);

(Continued)

(58) Field of Classification Search
CPC .. F16D 13/52; F16D 21/06; F16D 2021/0638; F16D 3/006–2003/008; B60K 6/405; B60K 6/38–387; B60K 2006/4833
See application file for complete search history.

(56) References Cited

U.S. PATENT DOCUMENTS

| | | | | |
|---|---|---|---|---|
| 9,193,255 | B2 * | 11/2015 | Arnold | ..................... B60K 6/48 |
| 10,781,867 | B2 * | 9/2020 | Reimnitz | ................. B60K 6/40 |

(Continued)

FOREIGN PATENT DOCUMENTS

| | | |
|---|---|---|
| CN | 2931918 Y | 8/2007 |
| CN | 104786819 A | 7/2015 |

(Continued)

OTHER PUBLICATIONS

International Search Report and Written Opinion from corresponding International Application No. PCT/CN2019/120666, dated Jan. 19, 2020, 7 pages.

(Continued)

*Primary Examiner* — Ernesto A Suarez
*Assistant Examiner* — Lillian T Nguyen
(74) *Attorney, Agent, or Firm* — Tucker Ellis LLP

(57) ABSTRACT

A vehicle powertrain includes a power source, a clutch arrangement and a housing, the clutch arrangement arranged between the power source and a transmission. The clutch arrangement includes: a first clutch arranged to couple the power source to a first input shaft of the transmission and a second clutch arranged to couple the power source to a second input shaft of the transmission; and a torque transmission member having an extension in a radial direction and adapted to transmit torque from the power source to one of the first or second input shafts. The torque transmission member includes clutch lamellae carriers for the first and second clutches. The torque transmission member is jour- (Continued)

naled at a radially inner portion against the housing via one or more first bearings, and an output rotor shaft of the power source is journaled against the housing via one or more second bearings.

17 Claims, 2 Drawing Sheets

(52) U.S. Cl.
CPC ...... *F16D 21/06* (2013.01); *F16D 2021/0638* (2013.01)

(56) References Cited

U.S. PATENT DOCUMENTS

| | | | | |
|---|---|---|---|---|
| 2003/0089569 | A1* | 5/2003 | Antonov | F16D 25/0638 192/48.92 |
| 2018/0163793 | A1 | 6/2018 | Jeong et al. | |

FOREIGN PATENT DOCUMENTS

| | | | | |
|---|---|---|---|---|
| CN | 107743452 | A | 2/2018 | |
| DE | 102016218264 | A1 | 3/2018 | |
| DE | 102016222420 | A1 | 5/2018 | |
| DE | 102017104446 | A1 * | 9/2018 | ............ F16D 21/06 |
| DE | 102017104446 | A1 | 9/2018 | |
| DE | 102017109232 | A1 * | 10/2018 | ............ B60K 6/387 |
| DE | 102017109232 | A1 | 10/2018 | |
| DE | 102018122433 | A1 * | 3/2020 | ............ B60K 6/387 |
| FR | 2871111 | A1 | 12/2005 | |
| WO | 2018024281 | A1 | 2/2018 | |

OTHER PUBLICATIONS

Extended European Search Report from corresponding European Application No. 18214269.5, dated Jun. 6, 2019, 8 pages.

* cited by examiner

VEHICLE POWERTRAIN SYSTEM

RELATED APPLICATION DATA

This application is a continuation of International Patent Application No. PCT/CN2019/120666, filed Nov. 25, 2019, which claims the benefit of European Patent Application No. 18214269.5, filed Dec. 19, 2018, the disclosures of which are incorporated herein by reference in their entireties.

TECHNICAL FIELD

The present disclosure relates to a vehicle powertrain system comprising a power source, a clutch arrangement and a housing structure. The clutch arrangement is adapted to be arranged between the power source and a transmission. The clutch arrangement comprises a first clutch arranged to couple the first power source to a first input shaft of the transmission and a second clutch arranged to couple the first power source to a second input shaft of the transmission.

BACKGROUND

In electric vehicles or hybrid vehicles, a powertrain system with a power source, such as an electric machine, for transferring power is commonly used. In order to transfer torque, the power source has to be connected to an input shaft of the powertrain system. Conventional solutions usually have an electric machine that is connected via a gear directly to the input shaft or a crankshaft of an engine.

Another solution is to connect the power source via a gear coupled to a clutch arrangement for transferring torque to the input shaft. An electric machine can for example be connected to a casing of the clutch and the clutch may be connectable to the input shaft for transferring torque from the electric machine to the input shaft.

However, a clutch arrangement is usually designed for handling axial forces from a clutch shifting mechanism, but not radial forces. If the power source is rotating the clutch, the clutch is also subjected to significant radial load from the electric machine.

A further potential problem with a transmission where the power is transferred from a power source to a clutch arrangement at a position radially displaced from the rotation centre of the clutch arrangement, is the complexity of the clutch arrangement having several separate parts. This will generate a relatively long tolerance chain from the power source to the input shaft, which may increase the risk of misalignment and problem with radial run out of the clutch arrangement relative to the power source, or gears connecting the power source and the clutch arrangement.

There is thus a need for an improved powertrain system for electric or hybrid vehicles.

SUMMARY

An object of the present disclosure is to provide a powertrain system where the previously mentioned problems are avoided, which powertrain system eliminates or reduces at least some problems associated with a design where a power source, such as an electric machine, is connected to a clutch for transferring power to an input shaft.

This object is at least partly achieved by the features of the independent claims. The dependent claims contain further developments of the powertrain system.

The disclosure concerns a vehicle powertrain system comprising a first power source, a clutch arrangement and a housing structure. The clutch arrangement is adapted to be arranged between the first power source and a transmission, wherein the clutch arrangement comprises a first clutch arranged to couple the first power source to a first input shaft of the transmission and a second clutch arranged to couple the first power source to a second input shaft of the transmission. The clutch arrangement comprises a first torque transmission member having an extension in a radial direction and adapted to transmit torque from the first power source to one of the first input shaft and the second input shaft. The first torque transmission member comprises a clutch lamellae carrier for the first clutch and a clutch lamellae carrier for the second clutch. The first torque transmission member is journaled at a radially inner portion against the housing structure via one or more first bearings, and an output rotor shaft of the first power source is journaled against the housing structure via one or more second bearings.

Advantages with these features are that since both the first torque transmission member and the output rotor shaft are journaled against the housing structure, axial and radial forces can be handled efficiently while providing a construction with a reduced tolerance chain from the first power source to the input shaft. The construction is providing reduced risk for misalignment and problem with radial run out of the clutch arrangement relative to the first power source. The first and second clutches are when activated used for selective transfer of torque from the power source to the transmission.

According to an aspect of the disclosure, the housing structure journaling the first torque transmission member via the one or more first bearings and the rotor shaft via the one or more second bearings is arranged as a single unit structure. The single unit structure is providing a stable construction of the housing structure that is handling the axial and radial forces in an efficient way, and further is strengthening the housing structure. The single unit structure does not comprise any separate parts that may cause misalignment and tolerance issues, and thus the risk of misalignment is reduced since the relative bearing positions can be machined in one and same structural piece facilitating a correct centre-to-centre distance to be achieved.

According to another aspect of the disclosure, the first torque transmission member is arranged as a single unit structure. The single unit structure is providing a stable construction of the first torque transmission member that is handling forces in an efficient way, and further is strengthening the construction. The single unit structure of the first torque transmission member does not comprise any separate parts that may cause misalignment and tolerance issues.

According to an aspect of the disclosure, the clutch lamellae carrier of the first clutch and the clutch lamellae carrier of the second clutch are fixed to the first torque transmission member by welding, by a circlip arrangement, or cast or sintered into the structure of the first torque transmission member. Through the attachment, the clutch lamellae carriers are integrated into the structure of the first torque transmission member, which is providing a strong and reliable construction of the clutch arrangement that is preventing tolerance issues.

According to another aspect of the disclosure, the first power source is an electric machine arranged to transfer torque to the first torque transmission member. The electric machine as power source is providing an efficient torque transfer with high efficiency.

According to a further aspect of the disclosure, the system further comprises a second power source, wherein the clutch arrangement is adapted to be arranged between the second power source and the transmission. The first clutch is arranged to couple the second power source to the first input shaft and the second clutch is arranged to couple the second power source to the second input shaft. The first torque transmission member is adapted to transmit torque from the second power source to one of the first input shaft and the second input shaft. Through using a second power source, the powertrain can be designed with a high flexibility, where one of the two power sources, or alternatively two power sources together, can provide torque.

According to an aspect of the disclosure, the clutch arrangement further comprises a third clutch arranged to transfer torque from the second power source to the first torque transmission member, wherein the first torque transmission member comprises a clutch lamellae carrier for the third clutch. The third clutch is used for selective transfer of torque from the second power source. When activated, the third clutch is connecting the second power source to the first torque transmission member.

According to another aspect of the disclosure, the clutch lamellae carrier of the third clutch is arranged at a radially outer part of the first torque transmission member. Through this arrangement of the clutch lamellae carrier of the third clutch, a compact design of the clutch arrangement in the axial direction of the powertrain system is achieved.

According to a further aspect of the disclosure, the clutch lamellae carrier of the third clutch is fixed to the first torque transmission member by welding, by a circlip arrangement, or cast or sintered into the structure of the first torque transmission member. Through the attachment, the clutch lamellae carrier is integrated into the structure of the first torque transmission member, which is providing a strong and reliable construction of the clutch arrangement that is preventing tolerance issues.

According to an aspect of the disclosure, the second power source is an internal combustion engine or an electric machine arranged to transfer torque to the first torque transmission member. The second power source is providing high flexibility in the construction of the powertrain, and depending on the design, an internal combustion engine or an electric machine may be used. If using the internal combustion engine as the second power source, a hybrid powertrain is achieved. If instead the electric machine is used a fully electric powertrain is achieved.

According to another aspect of the disclosure, the first power source is via the output rotor shaft drivingly connected to a second torque transmission member, wherein the second torque transmission member is arranged to be in engagement with the first torque transmission member for transferring torque from the first power source. The second torque transmission member is connecting the first power source to the first torque transmission member for an efficient transfer of torque to the transmission.

According to a further aspect of the disclosure, the first torque transmission member comprises a first gear component, and the second torque transmission member comprises a second gear component, wherein the first gear component is arranged to be in engagement with the second gear component for transferring torque from the first power source to the first torque transmission member. The interaction of the gear components are providing a reliable and efficient transfer of torque between the second torque transmission member and the first torque transmission member.

According to an aspect of the disclosure, the first gear component is a gear ring comprising a first set of teeth arranged on a radially outer surface of the gear ring for engagement with the second gear component. The second gear component is a gear wheel comprising a second set of teeth arranged on a radially outer surface of the gear wheel arranged to be in engagement with the first gear component. The use of a gear ring in combination with a gear wheel is an efficient and reliable construction meeting the tolerance demands required in the powertrain system.

According to another aspect of the disclosure, the first torque transmission member comprises a body structure extending from the first gear component inwards in the radial direction, wherein the one or more first bearings are arranged between the housing structure and an inner radial surface of the body structure. This arrangement provides a rigid construction of the powertrain.

According to a further aspect of the disclosure, the first torque transmission member and the second torque transmission member are arranged to be in engagement with each other via a drive belt or a drive chain. Drive belts or drive chains are simple and reliable constructions that are providing suitable alternatives to gears.

According to an aspect of the disclosure, the one or more first bearings are angular contact bearings arranged to carry radial load and axial load when torque is transferred to the first torque transmission member. By using angular contact bearings, the construction can be designed to accommodate combined loads, such as simultaneously acting radial and axial loads. Further, the diameters of the bearings can be kept relatively small, which is suitable for high rotational speeds and a compact system design.

According to another aspect of the disclosure, the one or more second bearings are ball bearings arranged to carry at least radial load when torque is transferred to the first torque transmission member. The ball bearings are providing a simple and reliable construction suitable for high rotational speeds. They further can accommodate radial and axial loads in both directions and require little maintenance. The diameters of the bearings can be kept relatively small which is suitable for high rotational speeds and a compact system design.

BRIEF DESCRIPTION OF THE DRAWINGS

The disclosure will be described in greater detail in the following, with reference to the attached drawings, in which.

DETAILED DESCRIPTION

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Figure 1:
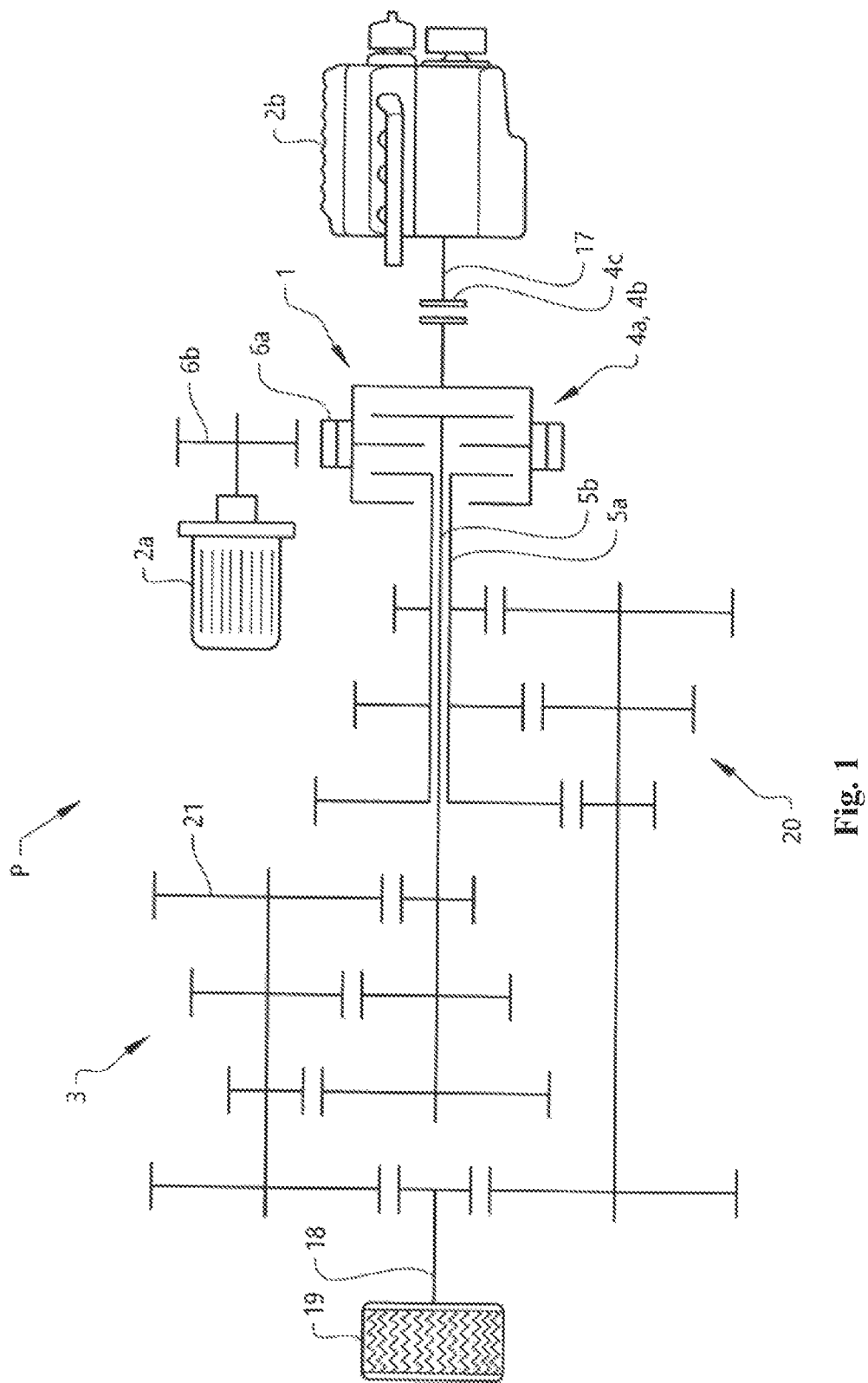
FIG. 1 shows schematically, a powertrain system according to the disclosure.

FIG. 1 shows a schematic view of a vehicle powertrain system P, comprising a first power source 2a, a second power source 2b, and a clutch arrangement 1. The clutch arrangement 1 is arranged between the first power source 2a and a transmission 3, and/or the second power source 2b and the transmission 3. The clutch arrangement 1 is arranged for transferring torque from the first power source 2a and/or the second power source 2b to an input shaft 5a, 5b of the transmission 1. In the example embodiment shown in FIG. 1, the vehicle powertrain system P is illustrated as a hybrid powertrain system with two power sources, where the first power source 2a is an electric machine and the second power source 2b is an internal combustion engine (ICE). Although, in the example embodiment illustrated in FIG. 1, the vehicle powertrain system P comprises an internal combustion engine for providing torque to the transmission, other types of power sources can be used. For example, another type of engine can be used instead of the internal combustion engine. Full electric vehicle powertrain systems are possible, where the second power source 2b may be omitted or alternatively be arranged as an electric machine.

The clutch arrangement 1 of the hybrid powertrain system in the example embodiment shown in FIG. 1 is of a dual clutch type. An output rotor shaft 12 of the first power source 2a can be selectively connected to a first input shaft 5a and a second input shaft 5b of the transmission 3. In addition, a crankshaft 17 of the second power source 2b can be selectively connected to the first input shaft 5a and the second input shaft 5b of the transmission 3. When the clutch arrangement 1 is connected to the first input shaft 5a, a first set of gears 20 of the transmission can be used, and when the clutch arrangement 1 is connected to the second input shaft 5b, a second set of gears 21 of the transmission can be used. The first input shaft 5a can be an outer input shaft and the second input shaft 5 can be an inner input shaft, where the inner and outer input shafts are arranged concentrically relative to each other. The transmission 3 comprises an output shaft 18 for transferring torque to wheels 19 of the vehicle, as schematically illustrated in FIG. 1. Although the vehicle powertrain system is exemplified by a dual clutch, it should be stressed that also other types of clutch arrangements can be used, such as for example a triple clutch.

Figure 2:
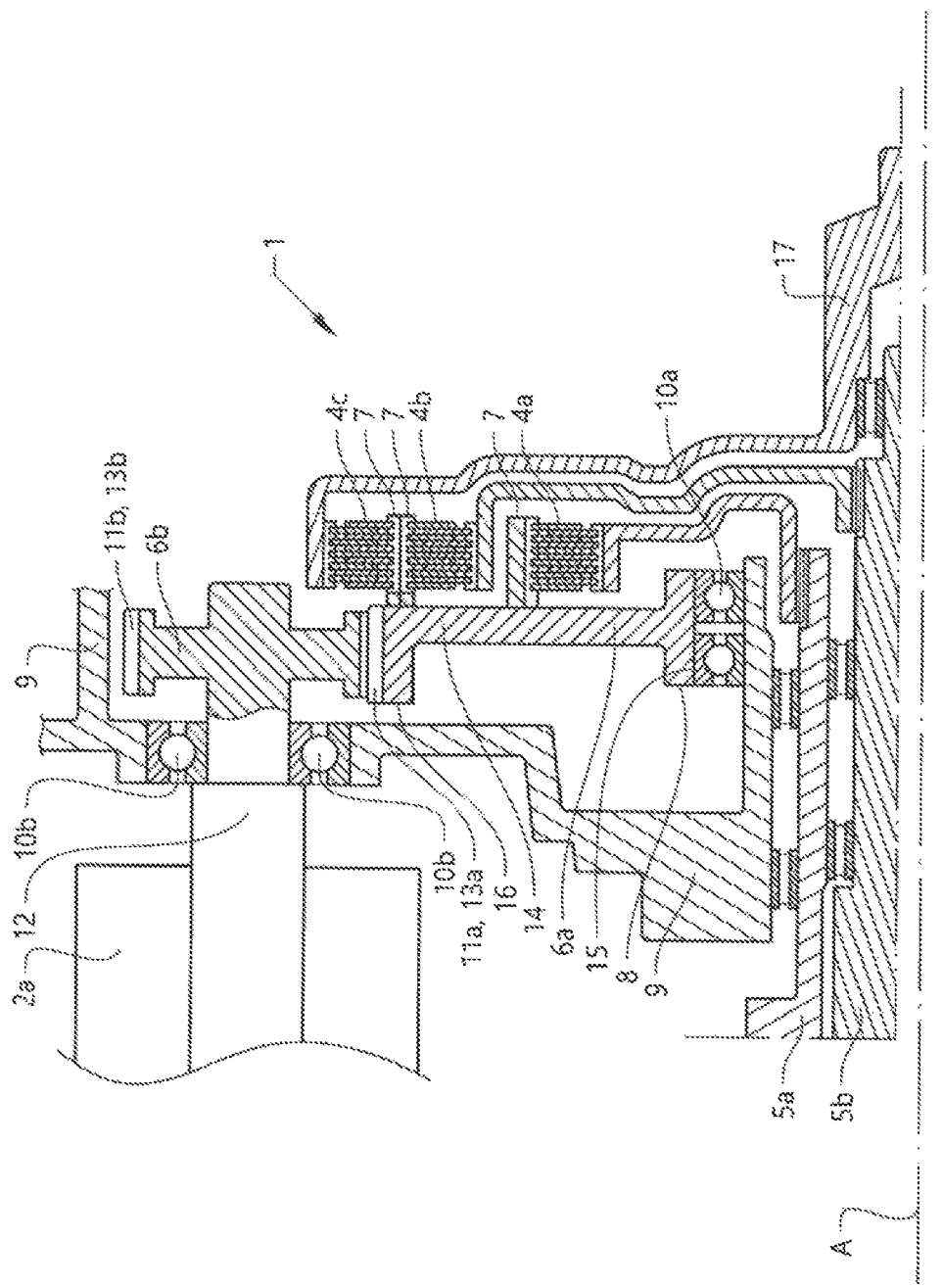
FIG. 2 shows schematically, an example embodiment of the powertrain comprising a first power source, a clutch arrangement, and a housing according to the disclosure.

In FIG. 2, components of an example embodiment of the vehicle powertrain system are illustrated more in detail. The vehicle powertrain system comprises a first power source 2a, a clutch arrangement 1, and a housing structure 9, a portion of which is shown in FIG. 2. The clutch arrangement 1 is adapted to be arranged between the first power source 2a and the transmission 3. The clutch arrangement 1 is of a dual clutch type and comprises a first clutch 4a and a second clutch 4b, where the first clutch 4a is arranged radially inwards the second clutch 4b. The first clutch 4a is arranged to couple the first power source 2a to a first input shaft 5a of the transmission 3. The second clutch 4b is arranged to couple the first power source 2a to a second input shaft 5b of the transmission 3. As further shown in FIG. 2, the clutch arrangement 1 comprises a first torque transmission member 6a having an extension in a radial direction and adapted to transmit torque from the first power source 2a to one of the first input shaft 5a and the second input shaft 5b. The first power source 2a is in the example embodiment shown in FIG. 2 an electric machine arranged to transfer torque to the first torque transmission member 6a. With radial direction is meant a direction perpendicular to a centre axis A of the vehicle powertrain system. The first clutch 4a and the second clutch 4b are provided with suitable actuating and control arrangements.

The first torque transmission member 6a comprises a clutch lamellae carrier 7 for the first clutch 4a and a clutch lamellae carrier 7 for the second clutch 4b. The respective clutch lamellae carriers 7 are attached to the first torque transmission member 6a. The lamella carriers 7 are arranged for holding inner or outer lamellae connecting the first clutch 4a to the first input shaft 5a and the second clutch 4b to the second input shaft 5b respectively. The clutch lamellae carrier 7 of the first clutch 4a and the clutch lamellae carrier 7 of the second clutch 4b are suitably fixed by welding to the first torque transmission member 6a. The first clutch 4a is, as illustrated in FIG. 2, arranged radially inwards of the second clutch 4b. Alternatively, the clutch lamellae carrier 7 of the first clutch 4a and the clutch lamellae carrier 7 of the second clutch 4b are attached to the first torque transmission member 6a by a traditional circlip arrangement for rigidly holding the clutch lamellae carriers in place. In a further alternative embodiment, the clutch lamellae carriers 7 of the first clutch 4a and the second clutch 4b are directly integrated in the structure of the first torque transmission member 6a. The clutch lamellae carriers 7 may then be cast or sintered into the structure of the first torque transmission member 6a during the manufacturing process and machined to suitable configurations.

The first torque transmission member 6a is arranged as a rotating unit driven by the first power source 2a and/or the second power source 2b. The first torque transmission member 6a is journaled at a radially inner portion 8 against the housing structure 9 via one or more first bearings 10a, and in the example embodiment shown in FIG. 2 two first bearings 10a are used for journaling the first torque transmission member 6a to the housing structure 9. The one or more first bearings 10a are arranged to carry radial load and axial load when torque is transferred to the first torque transmission member 6a. Any suitable types of bearings may be used for the one or more first bearings 10a, such as for example angular contact bearings. The first torque transmission member 6a comprises a body structure 14 extending from a radially outer part 16 in a direction inwards in the radial direction to an inner radial surface 15. The one or more first bearings 10a are arranged between the housing structure 9 and the inner radial surface 15 of the body structure 14, as shown in FIG. 2.

The housing structure 9 is arranged as a constructional component of the vehicle powertrain system carrying different structural parts of the vehicle powertrain system, such as for example bearings and differential. The housing structure 9 may be made of machined cast aluminum alloys or other suitable alloys, as a non-limiting example.

As further illustrated in FIG. 2, the output rotor shaft 12 of the first power source 2a is journaled against the housing structure 9 via one or more second bearings 10b arranged in the housing structure 9. In the example embodiment shown in FIG. 2 one first bearing 10b is used for journaling the output rotor shaft 12 to the housing structure 9. The one or more second bearings 10b are arranged to carry at least radial load when torque is transferred to the first torque transmission member 6. Any suitable types of bearings may be used for the one or more second bearings 10b, such as for example traditional ball bearings.

The housing structure 9 is arranged for securing small dimensional variations when transferring torque from the first power source 2a to the first torque transmission member 6a. The cooperating parts connecting the first power source 2a to the first torque transmission member 6a are made with small tolerances and therefore the housing structure 9 must be designed to carry the components involved without major dimensional variations when mounted to the housing structure 9 and during torque transfer. To establish a construction with small tolerances, the housing structure 9, which is journaling the first torque transmission member 6a via the one or more first bearings 10a and the rotor shaft 12 via the one or more second bearings 10b, may be arranged as a single unit structure. The single unit structure may be cast or sintered and machined into a desired shape from suitable alloys. Through machining the bearing supports in the single unit structure of the housing structure 9, a required centre distance between the bearings is achieved. Welding or other permanent bonds between constructional elements may be part of the forming process when manufacturing the housing structure 9 into the single unit structure. With a single unit structure is meant a constructional part manufactured as one structural piece. Thus, a single unit structure in not constructed of two or more pieces of material with joints between the pieces of material, where the joints could lead to undesired variations in dimensions.

As described above, the vehicle powertrain system P may further comprise a second power source 2b. The second power source 2b may be an internal combustion engine or an electric machine arranged to transfer torque to the first torque transmission member 6a. The second power source 2b is connected to the clutch arrangement 1 via the crankshaft 17. The clutch arrangement 1 is arranged between the second power source 2b and the transmission 3. The first clutch 4a is arranged to couple the second power source 2b to the first input shaft 5a, and the second clutch 4b is arranged to couple the second power source 2b to the second input shaft 5b. The first torque transmission member 6a is adapted to transmit torque from the second power source 2b to one of the first input shaft 5a and the second input shaft 5b. To selectively transferring torque from the second power source 2b to the first torque transmission member 6a, the clutch arrangement 1 further comprises a third clutch 4c.

The crankshaft 17 of the second power source 2b is suitably connected to the clutch arrangement 1 with the third clutch 4c for a selective transfer of torque from the second power source 2b to the transmission 3 via the clutch arrangement 1. The third clutch 4c is as illustrated in the figures arranged between the crankshaft 17 and the first torque transmission member 6a. This means that the first torque transmission member 6a is arranged for rotating together with the second power source 2b when the second power source 2b is connected to the clutch arrangement 1 via the third clutch 4c. In other words, the first torque transmission member 6a and the crankshaft 17 will rotate with the same speed when being connected. The third clutch 4c is provided with suitable actuating and control arrangements.

The first torque transmission member 6a comprises a clutch lamellae carrier 7 for the third clutch 4c. The clutch lamellae carrier 7 for the third clutch 4c is attached to the first torque transmission member 6a. The clutch lamella carrier 7 is arranged for holding inner or outer lamellae connecting the third clutch 4c to the crankshaft 17. As shown in FIG. 2, the clutch lamellae carrier 7 of the third clutch 4c is arranged at the radially outer part 16 of the first torque transmission member 6a. The clutch lamellae carrier 7 of the third clutch 4c is suitably fixed by welding to the first torque transmission member 6a. The first clutch 4a and the second clutch 4b are arranged radially inwards of the third clutch 4c, as illustrated in FIG. 2. Alternatively, the clutch lamellae carrier 7 of the third clutch 4c is attached to the first torque transmission member 6a by a traditional circlip arrangement for rigidly holding the clutch lamellae carrier in place. In a further alternative embodiment, the clutch lamellae carrier 7 of the third clutch 4c is directly integrated in the structure of the first torque transmission member 6a, where the clutch lamellae carrier 7 may be cast or sintered into the structure of the first torque transmission member 6a during the manufacturing process and machined to a suitable configuration.

The first power source 2a is drivingly connected to a second torque transmission member 6b via the output rotor shaft 12. The second torque transmission member 6b is arranged to be in engagement with the first torque transmission member 6a for transferring torque from the first power source 2a.

In the example embodiment illustrated in FIG. 2, the first torque transmission member 6a comprises a first gear component 11a. The second torque transmission member 6b comprises a second gear component 11b. The first gear component 11a is arranged to be in engagement with the second gear component 11b for transferring torque from the first power source 2a to the first torque transmission member 6a, and further to one of the first input shaft 5a and the second input shaft 5b.

The first gear component 11a may for example be a gear ring comprising a first set of teeth 13a, where the gear ring is arranged in connection to the radially outer part 16 of the first torque transmission member 6a. The first gear component 11a is suitably integrated in the first torque transmission member 6a, and rotationally locked directly to the radially outer part 16 of the first torque transmission member 6a. The first set of teeth 13a may be arranged on a radially outer surface of the gear ring for engagement with the second gear component 11b, as illustrated in FIG. 2. The first set of teeth 13a may be integrated in the structure of the first torque transmission member 6a, for example arranged as machined teeth established during the manufacturing process of the first torque transmission member 6a. The body structure 14 of the first torque transmission member 6a is extending from the first gear component 11a inwards in the radial direction to the inner radial surface 15 of the body structure 14.

The second gear component 11b may for example be a gear wheel comprising a second set of teeth 13b arranged on a radially outer surface of the gear wheel, as illustrated in FIG. 2. The second gear component 11b is arranged to be in engagement with the first gear component 11a. The first set of teeth 13a and the second set of teeth 13b are thus arranged to be in engagement with each other during transferring of torque from the first power source 2a to the first torque transmission member 6a.

In alternative embodiments, instead of using cooperating gear components, the first torque transmission member 6a and the second torque transmission member 6b may instead be in engagement with each other via a drive belt or a drive chain. The output rotor shaft 12 of the first power source 2a and the first torque transmission member 6a are then provided with suitable means for holding a drive belt or a drive chain.

The first torque transmission member 6a is arranged for transferring torque from the first power source 2a and/or the second power source 2b. The cooperating parts connecting the first power source 2a to the first torque transmission member 6a are made with small tolerances and therefore the first torque transmission member 6a must be designed without major dimensional variations when connected to the housing structure 9 and during torque transfer. To establish a construction with small tolerances, first torque transmission member 6a may be arranged as a single unit structure. The single unit structure may be cast or sintered and machined into a desired shape from suitable alloys. Welding or other permanent bonds between constructional elements may be part of the forming process when manufacturing the first torque transmission member 6a into the single unit structure. With a single unit structure is meant a constructional part manufactured as one structural piece. Thus, a single unit structure in not constructed of two or more pieces of material with joints between the pieces of material, where the joints could lead to undesired variations in dimensions.

The first torque transmission member 6a may be made of machined steel alloys or other suitable alloys, as a non-limiting example.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

| REFERENCE SIGNS |
| --- |
| 1: Clutch arrangement |
| 2a: First power source |
| 2b: Second power source |
| 3: Transmission |
| 4a: First clutch |
| 4b: Second clutch |
| 4c: Third clutch |
| 5a: First input shaft |
| 5b: Second input shaft |
| 6a: First torque transmission member |
| 6b: Second torque transmission member |
| 7: Clutch lamellae carrier |
| 8: Radially inner portion |
| 9: Housing structure |
| 10a: First bearings |
| 10b: Second bearings |
| 11a: First gear component, First torque transmission member |
| 11b: Second gear component, Second torque transmission member |
| 12: Output rotor shaft, First power source |
| 13a: First set of teeth, First gear component |
| 13b: Second set of teeth, Second gear component |
| 14: Body structure, First torque transmission member |
| 15: Inner radial surface, Body structure |
| 16: Radially outer part, First torque transmission member |
| 17: Crankshaft |
| 18: Output shaft, Transmission |
| 19: Wheels |
| 20: First set of gears, Transmission |
| 21: Second set of gears, Transmission |

What is claimed is:

1. A vehicle powertrain system comprising a first power source, a clutch arrangement and a housing structure, wherein the clutch arrangement is adapted to be arranged between the first power source and a transmission,
   wherein the clutch arrangement comprises a first clutch arranged to couple the first power source to a first input shaft of the transmission and a second clutch arranged to couple the first power source to a second input shaft of the transmission,
   wherein the clutch arrangement comprises a first torque transmission member having an extension in a radial direction and adapted to transmit torque from the first power source to one of the first input shaft and the second input shaft,
   wherein the first torque transmission member comprises a clutch lamellae carrier for the first clutch and a clutch lamellae carrier for the second clutch,
   wherein the first torque transmission member is journaled at a radially inner portion against the housing structure via one or more first bearings,
   wherein an output rotor shaft of the first power source is journaled against the housing structure via one or more second bearings.

2. The vehicle powertrain system according to claim 1, wherein the housing structure journaling the first torque transmission member via the one or more first bearings and the rotor shaft via the one or more second bearings is arranged as a single unit structure.

3. The vehicle powertrain system according to claim 1, wherein the first torque transmission member is arranged as a single unit structure.

4. The vehicle powertrain system according to claim 1, wherein the clutch lamellae carrier of the first clutch and the clutch lamellae carrier of the second clutch are fixed to the first torque transmission member by welding, by a circlip arrangement, or cast or sintered into the structure of the first torque transmission member.

5. The vehicle powertrain system according to claim 1, wherein the first power source is an electric machine arranged to transfer torque to the first torque transmission member.

6. The vehicle powertrain system according to claim 1, wherein the system further comprises a second power source, wherein the clutch arrangement is adapted to be arranged between the second power source and the transmission,
   wherein the first clutch is arranged to couple the second power source to the first input shaft and the second clutch is arranged to couple the second power source to the second input shaft,
   wherein the first torque transmission member is adapted to transmit torque from the second power source to one of the first input shaft and the second input shaft.

7. The vehicle powertrain system according to claim 6, wherein the clutch arrangement further comprises a third clutch arranged to transfer torque from the second power source to the first torque transmission member, wherein the first torque transmission member comprises a clutch lamellae carrier for the third clutch.

8. The vehicle powertrain system according to claim 7, wherein the clutch lamellae carrier of the third clutch is arranged at a radially outer part of the first torque transmission member.

9. The vehicle powertrain system according to claim 7, wherein the clutch lamellae carrier of the third clutch is fixed to the first torque transmission member by welding, by a circlip arrangement, or cast or sintered into the structure of the first torque transmission member.

10. The vehicle powertrain system according to claim 6, wherein the second power source is an internal combustion engine or an electric machine arranged to transfer torque to the first torque transmission member.

11. The vehicle powertrain system according to claim 1, wherein the first power source via the output rotor shaft is drivingly connected to a second torque transmission member, wherein the second torque transmission member is arranged to be in engagement with the first torque transmission member for transferring torque from the first power source.

12. The vehicle powertrain system according to claim 11, wherein the first torque transmission member comprises a first gear component, and the second torque transmission member comprises a second gear component, wherein the first gear component is arranged to be in engagement with the second gear component for transferring torque from the first power source to the first torque transmission member.

13. The vehicle powertrain system according to claim 12, wherein the first gear component is a gear ring comprising a first set of teeth arranged on a radially outer surface of the gear ring for engagement with the second gear component,
wherein the second gear component is a gear wheel comprising a second set of teeth arranged on a radially outer surface of the gear wheel arranged to be in engagement with the first gear component.

14. The vehicle powertrain system according to claim 12, wherein the first torque transmission member comprises a body structure extending from the first gear component inwards in the radial direction, wherein the one or more first bearings are arranged between the housing structure and an inner radial surface of the body structure.

15. The vehicle powertrain system according to claim 11, wherein the first torque transmission member and the second torque transmission member are arranged to be in engagement with each other via a drive belt or a drive chain.

16. The vehicle powertrain system according to claim 1, wherein the one or more first bearings are angular contact bearings arranged to carry radial load and axial load when torque is transferred to the first torque transmission member.

17. The vehicle powertrain system according to claim 1, wherein the one or more second bearings are ball bearings arranged to carry at least radial load when torque is transferred to the first torque transmission member.

* * * * *